(12) United States Patent
Hotti

(10) Patent No.: US 7,890,547 B2
(45) Date of Patent: Feb. 15, 2011

(54) CONTENT DELIVERY SERVER

(75) Inventor: Timo Hotti, Lohja As (FI)

(73) Assignee: Oy International Business Machines Ab, Helsinki (FI)

( * ) Notice: Subject to any disclaimer, the term of this patent is extended or adjusted under 35 U.S.C. 154(b) by 975 days.

(21) Appl. No.: 11/386,917

(22) Filed: Mar. 22, 2006

(65) Prior Publication Data

US 2007/0226810 A1    Sep. 27, 2007

(51) Int. Cl.
*G06F 17/30* (2006.01)
(52) U.S. Cl. .................................... 707/803
(58) Field of Classification Search ............... None
See application file for complete search history.

(56) References Cited

U.S. PATENT DOCUMENTS

| | | | |
|---|---|---|---|
| 6,351,753 B1 * | 2/2002 | Jagadish et al. | 707/203 |
| 6,748,437 B1 * | 6/2004 | Mankude et al. | 709/227 |
| 7,287,089 B1 * | 10/2007 | Lamoureux et al. | 709/238 |
| 7,461,067 B2 | 12/2008 | Dewing et al. | |
| 2003/0119531 A1 * | 6/2003 | Patton et al. | 455/461 |
| 2004/0068532 A1 | 4/2004 | Dewing et al. | |
| 2006/0161635 A1 * | 7/2006 | Lamkin et al. | 709/217 |
| 2006/0271552 A1 * | 11/2006 | McChesney et al. | 707/10 |
| 2007/0112676 A1 * | 5/2007 | Kontio et al. | 705/50 |

* cited by examiner

*Primary Examiner*—Charles Rones
*Assistant Examiner*—Yuk Ting Choi
(74) *Attorney, Agent, or Firm*—Ingrid Foerster; SVL IP Law

(57) ABSTRACT

A method and arrangement for implementing a content delivery server is disclosed. The arrangement contains at least one content delivery server and plurality of content terminals. The first computer has means to identify at least one set of content data items from plurality of content data items, means to identify at least one set of second computers from said plurality of second computers and means to link at least one identified set of content data with at least one identified set of second computers. The content delivery server assigns at least one content data item of said identified set of content data items to at least one second computer of said identified group of second computers based on said link.

84 Claims, 17 Drawing Sheets

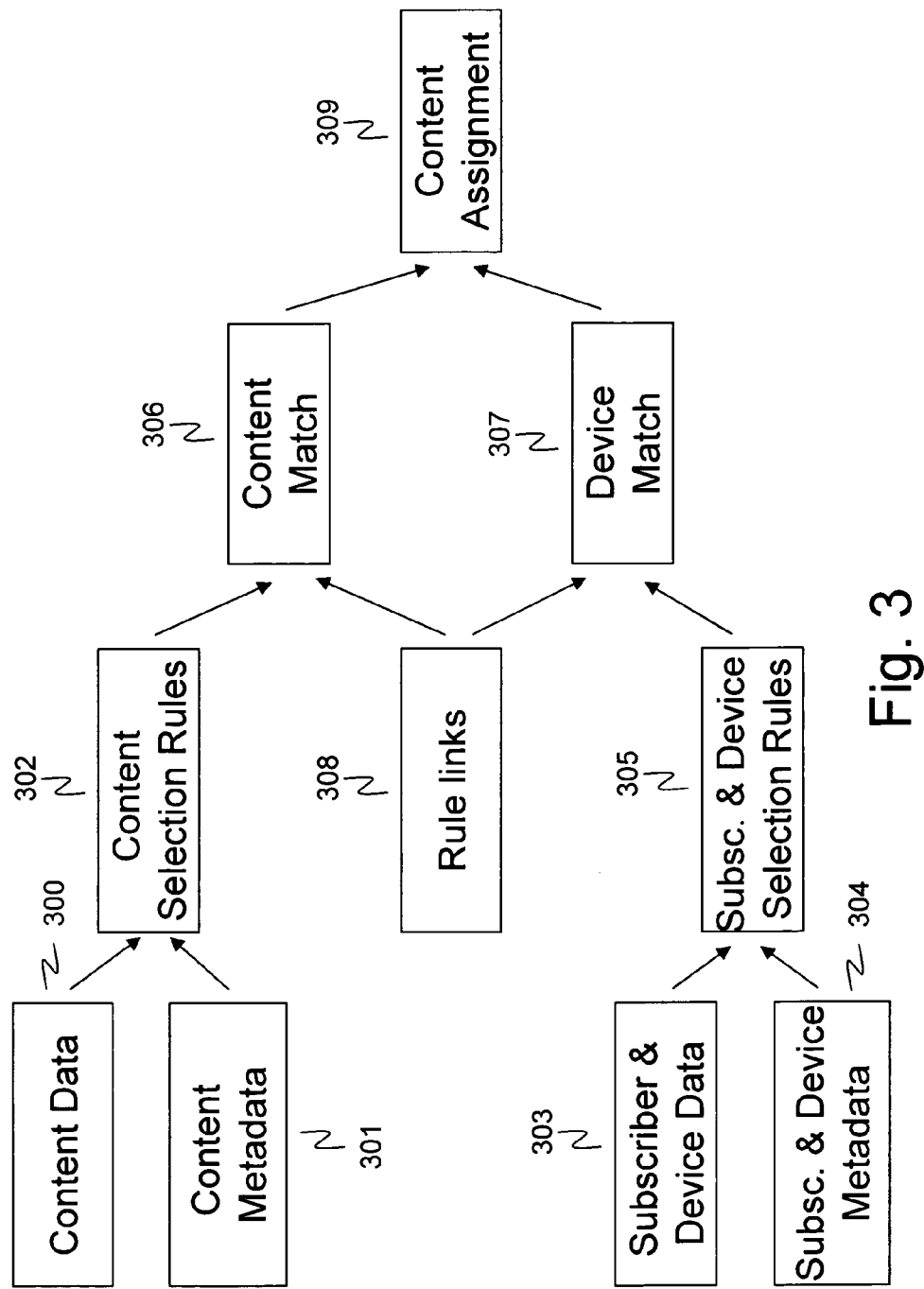

CONTENT_HEADER

| ID | CONTENT_NAME |
|---|---|
| 1 | LE MANS RACE |
| 2 | SPORTS TALKS |

CONTENT_SEGMENT

| HDR_ID | SEQ_NO | NAME |
|---|---|---|
| 1 | 1 | 1ST HALF OF RACE |
| 1 | 2 | HALF-WAY PIT STOPS |
| 1 | 3 | 2ND HALF OF RACE |
| 2 | 1 | ENTIRE SHOW |

CONTENT_METADATA

| HDR_ID | SEG_NO | SEQ_NO | METADATA |
|---|---|---|---|
| 1 | 0 | 1 | "SPORT" |
| 1 | 0 | 2 | "MOTOR" |
| 1 | 2 | 1 | "ACTION" |
| 1 | 3 | 1 | "ACTION" |
| 2 | 1 | 1 | "TALK SHOW" |
| 2 | 1 | 2 | "SPORTS" |

Fig. 4a

CONTENT_RULE — 430

| RULE_ID | RULE_NAME |
|---|---|
| 1 | MOTOR SPORTS ACTION |
| 2 | TALK SHOWS ABOUT SPORTS |

431, 432a, 432b

CONTENT_RULE_CRITERION — 440

| RULE_ID | SEQ_NO | CRITERION |
|---|---|---|
| 1 | 1 | "SPORT" |
| 1 | 2 | "MOTOR" |
| 1 | 3 | "ACTION" |
| 2 | 1 | "TALK SHOW" |
| 2 | 2 | "SPORT" |

| DEVICE | |
|---|---|
| ID ~501 | NAME ~500 |
| 1 | SMITH'S SET-TOP BOX ~502a |
| 2 | BROWN'S SET-TOP-BOX ~502b |
| 3 | SMITH'S CELL PHONE ~502c |

| DEVICE_METADATA ~510 | | |
|---|---|---|
| DEV_ID | SEQ_NO ~511 | NAME |
| 1 | 1 | DEVICE="SET-TOP BOX" ~512a |
| 1 | 2 | OWNER="SMITH" ~512b |
| 1 | 3 | LOCATION="HELSINKI" ~512c |
| 2 | 1 | DEVICE="SET-TOP BOX" ~512d |
| 2 | 2 | OWNER="BROWN" ~512e |
| 2 | 3 | LOCATION="TURKU" ~512f |
| 3 | 1 | DEVICE="CELL PHONE" ~512g |
| 3 | 2 | OWNER="SMITH" ~512h |
| 3 | 3 | LOCATION="HELSINKI" ~512i |

Fig. 5a

DEVICE_RULE

| ID | NAME |
|----|------|
| 1  | SET-TOP BOXES IN HELSINKI |
| 2  | ALL DEVICES OF MR. SMITH |

520, 521, 522a, 522b

DEVICE_RULE_CRITERION

| RULE_ID | SEQ_NO | CRITERION |
|---------|--------|-----------|
| 1 | 1 | DEVICE="SET-TOP BOX" |
| 1 | 2 | LOCATION="HELSINKI" |
| 2 | 1 | OWNER="MR. SMITH" |

| CONTENT_RULE_MATCH ~600 | | |
|---|---|---|
| CONTENT_RULE_ID ~601 | CONTENT_HEADER_ID ~602a | CONTENT_SEGMENT_ID ~602b |
| 1 | 1 | 2 |
| 1 | 1 | 3 |
| 2 | 2 | 1 |

Fig. 6a

| DEVICE_RULE_MATCH ~610 | |
|---|---|
| DEVICE_RULE_ID ~611 | DEVICE_ID ~612a |
| 1 | 1 |
| 2 | 1 |
| 2 | 3 |

| RULE_LINK | |
|---|---|
| CONTENT_RULE_ID | DEVICE_RULE_ID |
| 1 | 1 |
| 2 | 2 |

- 620 RULE_LINK
- 621 CONTENT_RULE_ID
- 622a DEVICE_RULE_ID
- 622b

Fig. 6d

| CONTENT_ASSIGNMENT | | | |
|---|---|---|---|
| DEVICE_ID | CONTENT_HEADER_ID | SEGMENT_SEQ_NO | |
| 1 | 1 | 2 | |
| 1 | 1 | 3 | |
| 1 | 2 | 1 | |
| 3 | 2 | 1 | |

- 630 CONTENT_ASSIGNMENT
- 631 CONTENT_HEADER_ID
- 632a SEGMENT_SEQ_NO
- 632b
- 632c
- 632d

CONTENT DELIVERY SERVER

TECHNICAL FIELD OF INVENTION

The present invention relates generally to digital content management. Especially, the invention relates to providing a manageable and scalable system and method for digital content delivery.

BACKGROUND OF THE INVENTION

Digital content delivery from content libraries of a content provider to terminal devices has been in widespread use since the adoption of the World Wide Web (WWW). In its simplest form, a content delivery system of the prior art consists of a Web server from where a client terminal such as a Web browser running on a personal computer may download content identified by an Uniform Resource Locator (URL). Such a simple system has its limitations, however. Most importantly, a single server has its limits in terms of maximum performance. Too many concurrent client terminals downloading data from the server cause the download speed experienced by a client to drop below a critical lower limit which makes rendering multimedia content unpractical.

Digital content may be enhanced by attaching metadata to the content. For example, an audio track containing music may have metadata attached that contain information about the name of the track, artist, composer, genre and date of recording. Similarly, a video stream of a motion picture may contain metadata about the actors, director and producer of the motion picture. In case of a video stream, the stream often consists of a number of segments. Each segment may have its own metadata attached. Such metadata contains information about what the particular segment of the video contains. In video streams, the metadata may be of a standardized nature, e.g., following MPEG-7 or MPEG-21 standards that are based on an Extensible Markup Language (XML) standard. Some metadata may be provided by the provider of the content, but metadata may also be created by individual users of the content. For example, in the World Wide Web, some web sites allow users to tag content. Other users may then use the tagging data to find the content they want to access and use.

Users of the World Wide Web may use various ways to find the content they are interested about. Most typically, users enter some plain text to a search engine as a search criterion. The search engine executes the query against its databases and returns a list of URLs (Uniform Resource Locator) to the web browser of the user. The list typically is sorted by relevance.

Another way to access data that is of interest to the user is to use an alert service. For example, some news sites in the Web provide a service that sends a notification e-mail to a user whenever content matching a persistent search criteria specified by the user is input to the content database. The user may for instance request that whenever a news item containing the word "baseball" is created, a notification about the item along with the URL of the item is sent to the e-mail address given by the user.

Yet another way to receive a specific kind of content data from the web is a so called "Podcast." Podcast is a service accessible through an URL that provides a "channel" of content for download into a rendering device such as a mobile digital audio player device. For example, an URL may provide a certain daily radio program that has been made available for download. The content of the Podcast channel typically changes regularly, thus providing different content for each download. A user may render the content from the local storage of the device at his/her convenience.

Personalized websites are also well known in the prior art. Such a web site identifies the user and provides a personalized view to the services provided by the web site. For example, the web site may provide different content or a user interface depending on who is accessing the web site.

Patent application US 2004/0068532 teaches a system for supporting production, management and delivery of media content for wireless devices. The method teaches a usage of a single rules engine that uses rules for selecting and delivering such content to mobile devices that can be delivered and rendered in the target device. According to the method, content data is stored in a file server and related rules and metadata are stored in a separate relational database server. Having some data in a file server and some other data in a relational database server introduces a risk of losing data integrity within the overall data model if an error occurs when writing data to the system. Storing data as files in a file server also means that the data cannot be written, e.g., deleted from the system while it is being concurrently read. Moreover, the method of the patent application does not teach a way to scale up the system's content delivery capacity.

The prior art provides suitable methods and systems for finding, accessing and rendering content and metadata in a system where content meeting some search criteria needs to be delivered to individual terminals. However, those methods and systems are not suitable for maintaining reliably and manageably a relevant copy of digital content along with data related to the content in a specified group of devices. Only a set of content that matches the user's or user group's needs, should preferably be sent to the designated devices of the users. When the content is not any more relevant in the device, it should for usability and resource consumption reasons be automatically deleted from the device by the server that sent the piece of content to the device. For manageability reasons, the server should always maintain information about what data actually is in each of the devices with which the server interacts. Users also need to have access to the same content from multiple different devices. Hence, the delivery system should provide a capability for identifying all the devices which a piece of content should be delivered. The methods taught by the prior art also fail to provide a solution for managing digital content in a large content delivery network from a centralized management system. The methods taught by the prior art also fail to provide a method that guarantees good performance and data availability in situations where the same data is being read and written simultaneously in the devices of the network. Finally, the methods taught by the prior art fail to provide a quick system recovery in an error situation where a server computer fails because of a fatal software or hardware error.

OBJECT OF THE INVENTION

One object of the present invention is to provide a method and system for implementing a scalable content delivery server that is able to maintain a copy of digital content data and data associated with the digital content data in specified groups of terminal devices. Further, the object of the invention is to provide a method and system for remotely managing the delivery and maintenance of content data and data related to the content data in a number of terminal devices in a simple, dependable, reliable and highly available manner.

SUMMARY OF THE INVENTION

The content delivery server is a data management server, preferably capable of managing data of complex data models as well as providing transactional data access and manipulation services. The delivery server receives annotated content data as well as data about devices as input and processes the data based on some content selection and device selection rules to maintain information about delivery destinations of the content data. Terminals may at any point of time request from the content delivery server updates to content and metadata that is assigned for the terminal. Those updates may contain new data, updated data or instructions to delete data from the terminal.

The objects of the invention are achieved by using content selection rules for determining a set of content data and device selection rules for identifying a group of terminal devices, linking an identified content data set to an identified device set and assigning each data item of the content data set to each device of the identified device group. Further, the objects of the invention are achieved by observing changes in the content data and device data and adjusting the content assignment data accordingly. Yet further, the objects of the invention are achieved by synchronizing the data of a terminal device with the help of the content assignment data. Still yet further, the objects of the invention are achieved by managing all data of the system in database management systems that are capable of transactional data management of all data of the system, data distribution and database mirroring.

In one preferred embodiment, the server receives the following categories of data from one or multiple sources as input data:
 Content data, for example streaming data, document data, XML data, HTTP pages, computer executable scripts, computer executable application binary code, system and application configuration data or any other such data,
 content meta data, i.e., data describing the content data,
 content selection rules,
 device data identifying devices to which content data can be delivered,
 device meta data, i.e., data describing the properties of the device,
 device selection rules, and
 data that links together content selection and device selection rules.

Additionally, to facilitate more efficient operation of the server, the content delivery server may maintain a change log that contains information about what's the last data item of each category (content and device data, metadata and rules) processed by the server. This way, changed data can be processed by the server in an incremental manner.

Whenever the content delivery server of the present invention receives new or updated data in one or multiple transactions from one or multiple data sources or it updates some data itself, it may run a batch program that matches rule data with metadata. Following the matching, the server maintains content assignment data that expresses which terminals should contain a particular piece of content data and related content metadata. Database transactions are preferably applied in this assignment process to ensure consistency of the assignment data.

A terminal may request at any point of time, also during the assignment process, a data refresh package for the content that has been assigned to the terminal. Upon such a request, the server identifies content data that should be sent to the terminal based on the current committed state of the content assignment data. In a relational database, this is easily done by joining data from the content assignment table with data from the content table. Further data, such as the metadata related to the assigned content, may be included into the result set using another join operation. Like the assignment process, the refresh package assembly operation is best done in one database transaction that sees a consistent view to the database of the content delivery server.

Depending on the scalability and other needs of the system, the topology of the system may vary. In the simplest implementation, there is only one distribution server that maintains all input data mentioned above. Should the system need to be scaled up, the number of distribution servers can be increased. Now the content and device data along with their metadata may be moved to a different server from where the data is synchronized to the distribution servers. In the most complex distribution topology, content data, device data and distribution rules may all reside in different servers from where appropriate data is synchronized to those distribution servers that need the data. In some embodiments of the invention, the rule execution process may occur also in another rule server. In this case, the rule match data resulting from the rule execution process is sent from the rule server to the delivery server where it is used for maintaining the content assignment data that eventually determines what content data should be sent to which devices.

In some embodiments, some of the content metadata may be device or subscriber specific. For example, the terminal may update some of the metadata or enter its own metadata to content or device data and send the updated and/or new data to the distribution server. The distribution server may process the changed metadata and adjust the content assignment data accordingly. For example, a terminal may add a "viewed-flag" as metadata of a video segment and send it back to the distribution server. The delivery server processes the new data and determines that the assignment row for the content segment and device should be deleted as the user wants to only have "non-viewed" segments of content in the local terminal device. When the terminal requests the next refresh package from the server, the segment of streaming video is deleted from the local terminal.

To achieve high availability and low cost of operation, the data of a distribution server may be mirrored from a primary server to another, secondary server containing an identical database. Preferably, 2-safe replication where transactions are committed synchronously in both databases should be used. This guarantees that both servers always contain data of all committed transactions. If the primary server fails, the secondary server takes over responsibilities of the primary server from the point where the primary server failed.

For concurrency control of the transactions of the distribution server, optimistic, also known as versioning, concurrency control is preferred. Versioning concurrency control means that if data is updated, the updating transaction creates a new version of the data whereas the old version of data is available to other transactions while the updating transaction is active. Because of this, write operations don't block access to concurrent reads and the distribution server is always available for serving the client terminals with consistent data.

The data transfer from the data sources to the content distribution server and from the distribution server to the terminal may be implemented as purpose-made applications or it may be implemented using general purpose data synchronization techniques such as Solid SmartFlow™. A data synchronization technique is preferred between the distribution server and terminal if the terminal has a database that is capable of synchronizing data.

If the terminal is not equipped with a database with which the distribution server may synchronize, the data may be sent to the terminal in some other format, such as an XML document that is custom-made for each terminal or group of terminals. The XML document may be compliant with some standard such as MPEG-7 or MPEG-21. In this embodiment the multimedia content stream may be delivered to the terminal on-line as an HTIP or other stream. To facilitate this, the distribution server creates a set of URLs, one for each segment defined for the stream and sends the URLs to the terminal instead of the content segments. The terminal may now request any segment of the content feed from the server by sending the corresponding URL to the server.

One distribution server may use multiple different methods for maintaining the terminal assignment data of its content. The method used may depend for example on the type of the content metadata. For example, some metadata may be e.g. full text data such as TV program transcripts whereas some other content metadata may be of a data type particular to a certain content type. Metadata that is particular to a certain content type may be expressed in ontology. Different rules processing methods may be applied to different types of rules and metadata.

A preferred embodiment of this invention is to maintain a set of digital content data in specified terminals by matching content's metadata with a set of content selection rules, to identify a group of terminals by matching devices' metadata with a set of device selection rules and to maintain data that assigns a content data item to a terminal by linking together the content data set and device group.

The invention concerns a method for delivering digital content data comprising at least one first computer and plurality of second computers, wherein said first computer has means to identify at least one set of content data items from plurality of content data items based on the value of at least one metadata item related to said content data item, means to identify at least one set of second computers from said plurality of second computers based on the value of at least one metadata item related to at least one device data item representing said second computer and means to link at least one identified set of content data with at least one identified set of second computers, characterized in that said first computer assigns at least one content data item of said identified set of content data items to at least one second computer of said identified group of second computers based on said link.

The invention concerns also an arrangement for delivering digital content data comprising at least one first computer and plurality of second computers, wherein said first computer has means to identify at least one set of content data items from a plurality of content data items based on the value of at least one metadata item related to said content data item, means to identify at least one set of second computers from said plurality of second computers based on the value of at least one metadata item related to at least one device data item representing said second computer and means to link at least one identified set of content data with at least one identified set of second computers, characterized in that said first computer is arranged to assign at least one content data item of said identified set of content data items to at least one second computer of said identified group of second computers based on said link.

The advantage of the invention is the ability to provide in an efficient and reliable manner operable scalable continuous content and device search service that maintains a copy of such content in those terminals where the content is deemed relevant by the rules. Another advantage of the invention is the ability to provide high availability capabilities for the system using standard database replication capabilities. Yet another advantage of the invention is the ability to use advanced query and transaction management capabilities of a standard relational database efficiently in the implementation of the content search and delivery service.

The best mode of the invention is considered to be the search of digital content and maintenance of the digital content data and data related to the content data in separately specified groups of terminals.

Some embodiments of the invention are described in the dependent claims.

BRIEF DESCRIPTION OF THE DRAWINGS

The foregoing and other objects, features and advantages of this invention will be apparent from the following more particular description of the preferred embodiments of the invention as illustrated in accompanying drawings.

FIG. 3 shows an exemplary method of maintaining content assignment data according to the invention.

FIGS. 4a and 4b show an exemplary data model for managing content selection rules, digital content and metadata related to the content according to the invention.

FIGS. 5a and 5b show an exemplary data model for managing device selection rules, device data and metadata related to devices according to the invention.

FIGS. 6a-d show an exemplary data model for managing content and device rule match data, rule link data and content assignment data according to the invention.

DETAILED DESCRIPTION

Figure 1A:
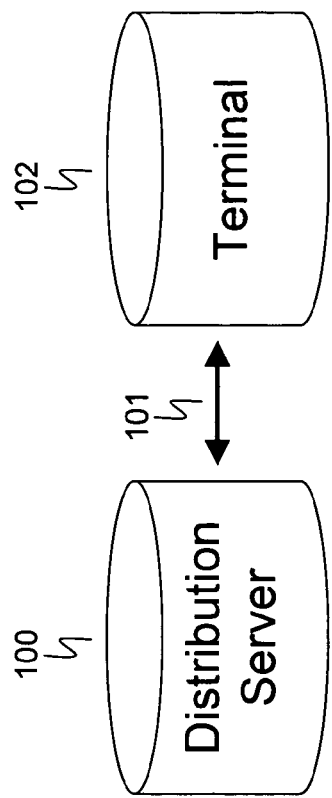
FIGS. 1a-c show exemplary arrangements of data storages to implement a content delivery system according to the invention.

FIG. 1a shows devices capable of storing and processing data arranged to form a digital content delivery network. The distribution server 100 maintains content data, content metadata, device data, device metadata, rules for selecting content and devices as well as data linking content and device selection rules together. The distribution server 100 also contains program logic to execute the rules and linking data to maintain information about which content data items should be sent to which terminals. The data storage of terminal 102 maintains a local copy of the content data assigned to the terminal. The data needed for the maintenance of the local copy of content data is transmitted from the distribution server 100 to the terminal 102 using data communication network 101 which may be a wireline or wireless data network. If both server and terminal devices have a database server or other software process that are capable of exchanging data using some mutually compatible data synchronization techniques, the data exchange between server and terminal is preferably implemented by such technique. There may be any number of terminal devices 102 communicating with a distribution server 100. It should be noted that a terminal device in this patent application may be any computer device that is capable of rendering multimedia content. In other words, a terminal device may be, for example, a server that may deliver the content further to other devices in a digital home network.

Figure 1B:
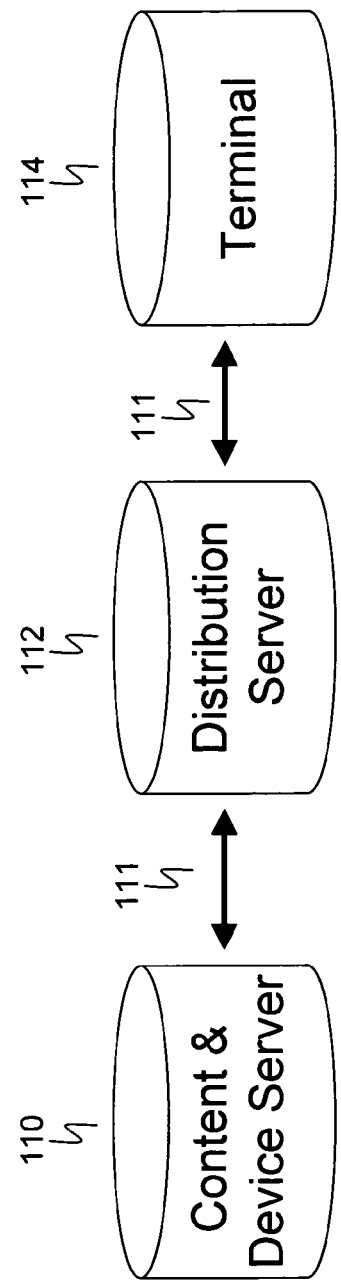

FIG. 1*b* shows another exemplary arrangement of servers and terminal devices to form a digital content delivery network. Content and device data as well as delivery rules are managed in one or multiple Content & Device Servers 110. A full or partial copy of this data is maintained in one or multiple distribution servers 112. The maintenance of the copy is preferably done using data synchronization techniques that transfer changed data between the servers using data communication network 111 that may be a wireless or wireline data network. The distribution server 112 contains program logic to execute the rules and linking data to maintain information about which content data items should be sent to which terminals. The terminal 114 receives data assigned to it by requesting the data from distribution server 112 using data communication network 111 that may be wireless or wireline data network.

Figure 1C:
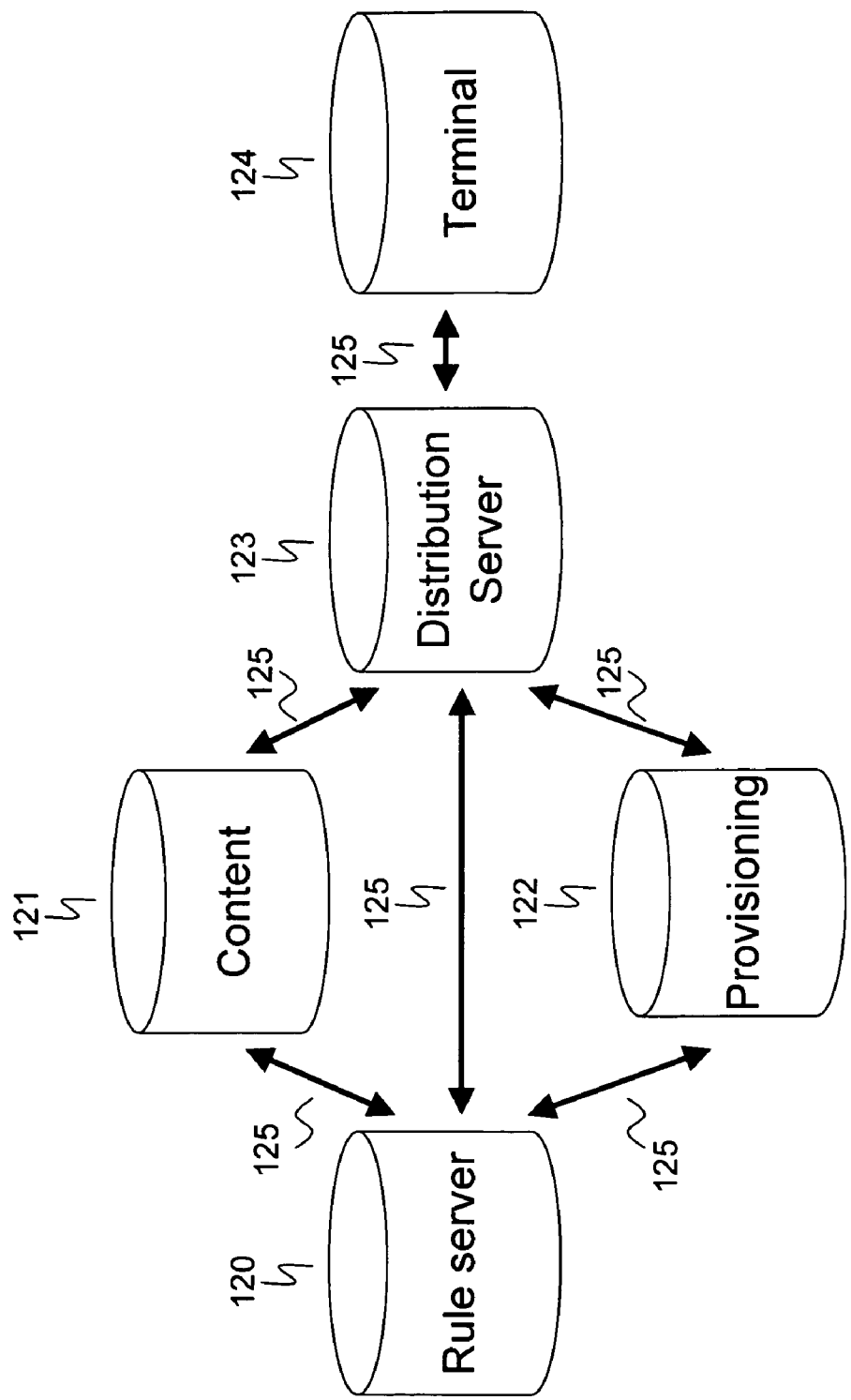

FIG. 1*c* shows yet another exemplary arrangement of servers and terminal devices to form a digital content delivery network. Digital content data such as video streams is stored in one or multiple content servers 121. According to the invention, digital content may also be document data, computer executable scripts or computer executable application code that may be compiled or interpreted code, for example. Also metadata related to the digital content may be stored in the content servers 121. Provisioning data of the system containing data about subscribers and devices as well as metadata about subscribers and devices is stored in one or multiple provisioning servers 122. Rule data for selecting content and devices as well as data linking the content and device selection rules together is managed in one or multiple rule servers 120. The content, provisioning and rule servers may exchange data with each other using a wireless or wireline data communication network 125. The distribution servers 123 of the system receive content data from the content servers 121, device data from provisioning servers 122 and rule data from rule servers 120 using a data communication network 125. The distribution server 123 stores a local copy of data it needs for its main task, which is to further distribute content data to a number of terminal devices 124 according to the rules and rule linking data specified in rule server 120. The data stored locally in the distribution servers 123 is preferably maintained using data synchronization techniques. Whenever data changes in its original (master) location, e.g., in a content server 121, provisioning server 122 or rule server 120, the (replica) copy of the data may be updated in all those distribution servers 123 that contain such copy.

Figure 2:
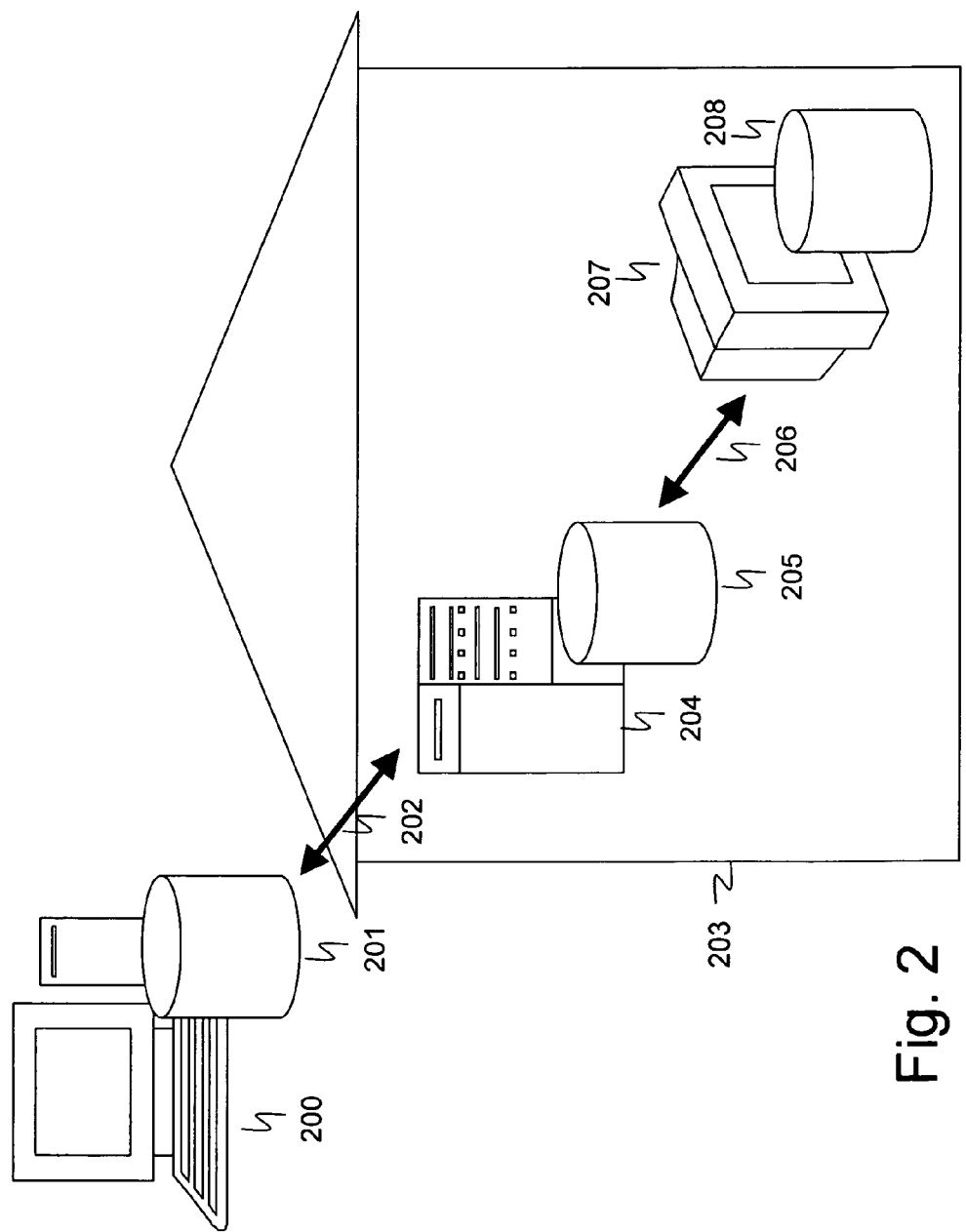
FIG. 2 shows an exemplary arrangement of computer server and terminal devices for a content delivery system according to the invention.

An exemplary arrangement of servers and terminal devices to deliver digital content into domains, each containing a number of terminals and a domain-specific distribution server is shown in FIG. 2. A central content and device management server 200 maintains the master copy of the content and device data of the system and stores it in its local data storage 201. The data is advantageously managed by a data management system such as a relational database. A replica copy of the content and device data that is relevant to a domain 203 such as a shopping center is sent to the content delivery server 204 of the domain using a data communication network 202. The network 202 may be for example a wide area network (WAN). The content delivery server 204 stores the data into its local storage device 205 that advantageously contains a database managed by a database management system (DBMS) such as a relational database server. The delivery of data from content and device management server 200 to the content delivery server 204 advantageously utilizes some data synchronization technique. The content delivery server 204 executes program logic that assigns content data to the terminal devices 207 of the domain. The program logic matches content metadata with content selection rules and device metadata with device selection rules and maintains data that assigns content data to devices using rule linking data. Each of the terminal devices 207 of the domain 203 advantageously maintains a local copy of the content assigned to the device in the storage device 208 of the terminal by receiving data from the content delivery server 207 via a data communication network 206 that may be a wide area network or a local area network (LAN).

FIG. 3 illustrates an exemplary method of maintaining content assignment data in a content delivery system. Content assignment data essentially expresses which content data item should be available in which terminal. Content metadata 301 related to content data 300 is matched with content selection rules 302 to maintain content rule match data 306. Similarly, metadata 304 related to subscriber and device data 303 is matched with device selection rules 305 to maintain device rule match data 307. Content 306 and device rule match data 307 are joined together using rule link data 308 to maintain content assignment data 309. Rule link data links a content selection rule with a device selection rule, thus making it possible to direct all content matching of a specified content rule to all devices that match the specified device rule.

FIG. 4*a* shows an exemplary data model for storing streaming content data in a relational database according to the invention. Although the example presented here is about streaming video data, a similar method and arrangement can be managing and delivering any other type of content data including documents, XML, HTTP pages, computer executable scripts and computer executable binary application code. For each content stream, there is one row 402*a,b* in a table called CONTENT_HEADER 400. In this patent application, the term "row" meaning a row of a table of a relationship database and the more general term "data term" are used interchangeably. The table contains two columns 401. ID is a unique identifier for each stream and CONTENT_NAME is the name of the stream. Each content stream may be split into one or multiple segments that are defined in the CONTENT_SEGMENT table 410. The table contains one row 412*a-d* for each segment. The exemplary table contains three columns 411:

HDR_ID refers to the ID column of the CONTENT_HEADER table,

SEQ_NO column is the sequence number of the segment within the stream and

NAME contains the name of the segment.

Additionally, the table advantageously contains the corresponding part of the video stream or the video stream may be stored in one or multiple "chunks" in a separate table (not shown in the picture). In this patent application, it is assumed unless stated otherwise that content data always contains streaming data or has access to the related streaming data stored in another entity of the data model.

According to the invention, it is possible to define content metadata for the entire stream and for each segment of the stream. In the exemplary data model shown, the content metadata is stored in a table called CONTENT_METADATA 420 that contains the following columns 421:

HDR_ID refers to the ID column of CONTENT_HEADER table,

SEG_NO refers to the SEQ_NO of CONTENT_SEGMENT table,

SEQ_NO is the sequence number of a metadata item within a segment and

METADATA contains the actual metadata value of the row.

In the example data, SEG_NO value 0 means that the metadata applies to an entire stream whereas a non-zero value means that the metadata item applies to an individual segment of the stream.

FIG. 4b shows an exemplary data model for storing the definitions of content rules. The rule header data is stored in a CONTENT_RULE table 430 that has two columns 431:

RULE_ID is the unique identifier for the rule and

RULE_NAME is the clear-text name of the rule.

In the rows 432a-b of the example table, two rules are defined. Each rule may consist of one or multiple criteria that are stored in the CONTENT_RULE_CRITERION table 440. The table has three columns 441:

RULE_ID refers to the RULE_ID column of the CONTENT_RULE table,

SEQ_NO is the sequence number of a criterion of a rule and

CRITERION column contains the data that will be used for searching.

For the sake of simplicity and clarity, the CRITERION data type of the example table is a character string (i.e., text) but also other types of data may be used as search criterion. In the example table, rows 442a-c contain the criteria for the rule represented by row 432a and rows 442d-e represent the criteria for the rule of row 432b. Also, for the sake of simplicity, it is assumed in the example that the criteria of a rule are combined using AND operators between the criteria. In other words, to match with the rule #1 (rows 432a, 442a-c) of the example, the content must have "SPORT", "MOTOR" and "ACTION" items in its metadata. In the example data of FIG. 4a, segments #2 and #3 (rows 412b and 412c) of stream 1 (row 402a) match the rule #1. The metadata items "SPORT" and "MOTOR" apply to all segments of the stream and "ACTION" applies to segments #2 and #3.

In FIG. 5a, a simplified exemplary data model for devices and their metadata is illustrated. The DEVICE table 500 contains header data for each device. At minimum the table contains two columns 501:

ID that is a unique identifier for each device and

NAME, a clear-text name for a device.

Additionally, the table may contain columns like ID of a subscriber using the device, the ID of the server responsible of provisioning the device and so forth. Those additional data items are not explained in detail as they are not essential for the present invention. In the example table, data of three devices 502a-c is stored. The properties of the devices are stored as device metadata in a separate DEVICE_METADATA table 510 that contains three columns 511:

DEV_ID refers to the ID column of the DEVICE table,

SEQ_NO column is a sequence number for metadata of a single device and

NAME column contains the value of the metadata item.

In the example table, metadata values are represented as plain text for the sake of clarity but in actual implementation, also other data types may be used. In the sample data shown in FIG. 5a, the device #1 (row 502a) has metadata items 512a-c, the device #2 (row 502b) has metadata items 512d-f and the device #3 (row 502c) has metadata items 512g-i.

The devices can be selected into a group by matching their metadata 512a-i with device rules. FIG. 5b shows an example data model for storing device rules in a relational database according to present invention. For each defined rule, there is a header row 522a-b in DEVICE_RULE table 520. At minimum, the DEVICE_RULE table contains two columns 521:

ID that is a unique identifier of a rule and

NAME that is a clear-text name of the rule.

Each rule may consist of one or multiple criteria that are stored in the DEVICE_RULE_CRITERION table 530. The table of the example data model contains three columns 531:

RULE_ID refers to the ID column of the DEVICE_RULE table,

SEQ_NO is a sequence number of a criterion of a rule and

CRITERION column contains the actual data value of the criterion.

The example data contains two rules. Rule #1 ("SET-TOP BOXES IN HELSINKI", row 522a) has two criteria 532a-b and rule #2 ("ALL DEVICES OF MR. SMITH", row 522b) has one criterion 532c. Like with content selection rules explained above, it is assumed in the example for the sake of simplicity that the criteria of a rule are combined using AND operators between the criteria.

For each matching content segment data item, the content delivery server maintains a data item that establishes a link between a matching content segment data item and a content rule. FIG. 6a shows one exemplary way to store such data items in a CONTENT_RULE_MATCH table 600. The table contains three columns 601:

CONTENT_RULE_ID refers to the RULE_ID column of the CONTENT_RULE table and thus identifies the rule with which some content segment matches.

CONTENT_HEADER_ID refers to the ID column of the CONTENT_HEADER table and thus identifies the content stream where the matching segment resides and CONTENT_SEGMENT_ID refers to the SEG_NO column of the CONTENT_METADATA table and thus identifies the matching content segment.

The example data of table 600 expresses that content segments #2 and #3 of content header #1 match with rule #1 (602a,b) and segment #1 of content header #2 matches with content rule #2 (602c). In some other embodiments, one content rule match item may represent multiple content data items that all match the content rule.

Analogously to searching matching content, the content delivery server also maintains a data item that establishes a link between a matching device data item and a device rule. FIG. 6b shows one exemplary way to store such data items in a DEVICE_RULE_MATCH table 610. The table contains two columns 611:

DEVICE_RULE_ID refers to the ID column of the DEVICE_RULE table and thus identifies the device rule with which some device matches and DEVICE ID refers to the ID column of the DEVICE table and thus identifies the matching device.

The example data of table 610 expresses that device #1 match with device rule #1 (row 612a) and devices #1 and #3 match with device rule #2 (rows 612b,c). In some other embodiments, one device rule match item may represent multiple device data items that all match the device rule.

To determine what content should be sent to a specified group of devices, a content rule is linked together with a device rule according to the invention. One exemplary way to establish this link is shown in FIG. 6c that illustrates a RULE_LINK table 620 that contains two columns 621:

CONTENT_RULE_ID column refers to the RULE_ID column of CONTENT_RULE table thus identifying a content rule and DEVICE_RULE_ID column refers to the ID column of a DEVICE_RULE table thus identifying a device rule.

The example data of table 620 expresses that content matching with rule #1 should be delivered to devices matching device rule #1 (row 622a) and content matching with rule #2 should be delivered to devices matching device rule #2 (row 622b).

Finally in FIG. 6d an exemplary way of implementing content assignment to a terminal according to the invention is disclosed. The CONTENT_ASSIGNMENT table 630 comprises three columns 631:

DEVICE_ID refers to the ID column of the DEVICE table 500 thus expressing the terminal in which a content segment should be available, CONTENT_HEADER_ID refers to the ID column of the CONTENT_HEADER table 400 thus identifying the content stream and SEGMENT_SEQ_NO column refers to the SEQ_NO column of the CONTENT_SEGMENT table 410 thus identifying the content segment.

In some embodiments, there may also be a SUBSCRIBER_ID column that expresses, to which subscriber the assigned content should be sent. The example data of table 630 expresses that device #1 should have a copy of content segments #2 and #3 of content stream #1 (rows 632a-b) and the segment #1 of stream #2 (row 632c) and that device #3 should have a copy of the segment #1 of stream #2 (row 623d). If the data of the content delivery server is stored in a relational database that is capable of executing queries written in Structured Query Language (SQL), it is quite trivial to select all content data currently assigned to a specified device using a simple SQL statement:

SELECT CONTENT_HEADER.*, CONTENT_SEGMENT.*
FROM
   CONTENT_ASSIGNMENT,
   CONTENT_HEADER,
   CONTENT_SEGMENT
WHERE
   CONTENT_ASSIGNMENT.DEVICE_ID=1 AND
   CONTENT_ASSIGNMENT.CONTENT_HEADER_ID=CONTENT_HEADER.ID AND
   CONTENT_ASSIGNMENT.SEGMENT_SEQ_NO=CONTENT_SEGMENT.SEQ_NO AND
   CONTENT_HEADER.ID=CONTENT_SEGMENT.HDR_ID

The above example returns all rows from CONTENT_HEADER and CONTENT_SEGMENT tables that have been assigned to terminal #1. The operation to combine data from multiple tables using search criteria is called a join operation. In the above query, for example all such data from CONTENT_HEADER is selected (joined) for which there is a matching row in the CONTENT_ASSIGNMENT table with DEVICE_ID column value 1. Further, data from CONTENT_HEADER table is joined together with data from CONTENT_SEGMENT table where the value of ID column of CONTENT_HEADER table is the same as the value of HDR_ID column of CONTENT_SEGMENT table.

The significant advantage of the present invention is that by organizing, managing and manipulating digital content data, related metadata and rules in a way explained in this patent application, some very complex functionality needed for the maintenance of the data in terminal devices may be left for standard database functionality. This reduces significantly the amount of application level programming needed to implement a complex and scalable content delivery system.

Figure 7:
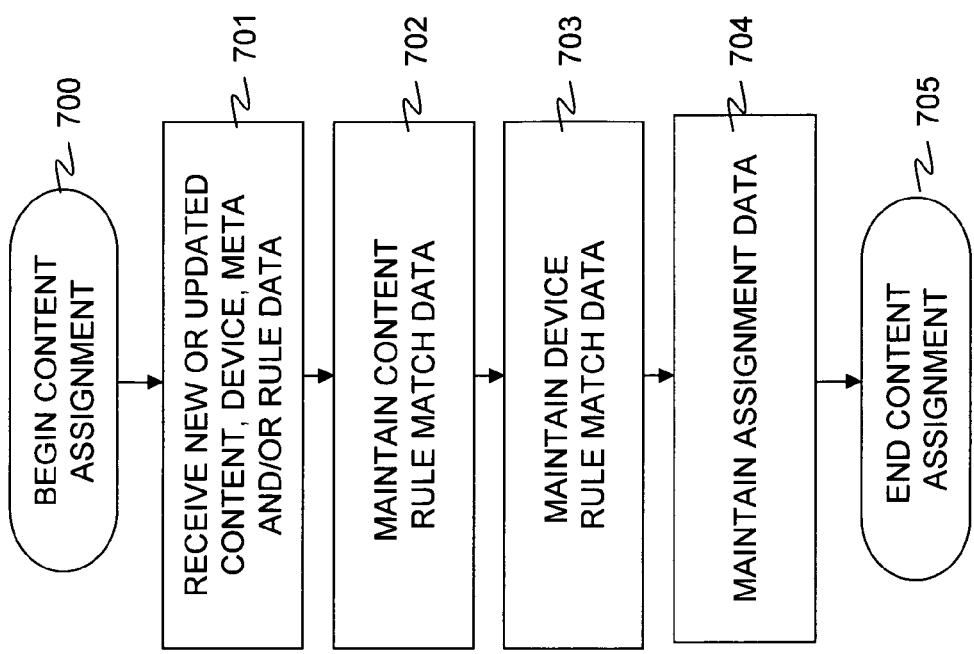
FIG. 7 illustrates an exemplary method of assigning content to terminals according to the invention.

To maintain the data shown in the FIGS. 4-6, the servers of the present invention have to execute computer executable programs. FIG. 7 illustrates the necessary steps to assign digital content to terminal devices at a high level 700. The need for maintaining the content assignment data arises whenever new data is entered to the server or existing data is updated 701. The added or updated data may be any of the following:

content data 400, 410 and content metadata 420,
device data 500 and device metadata 510,
content selection rule 430,440,
device selection rule 520,530 and
rule link data 620.

If any content-related data is changed, the server must maintain content rule match data 702. Similarly, whenever device-related data is changed, the server must maintain device rule match data 703. If any of the content rule match data 600, device rule match data 610 or rule link data 620 is changed, the server needs to update the content assignment data 630 accordingly 704. Content assignment ends at 705.

Figure 8:
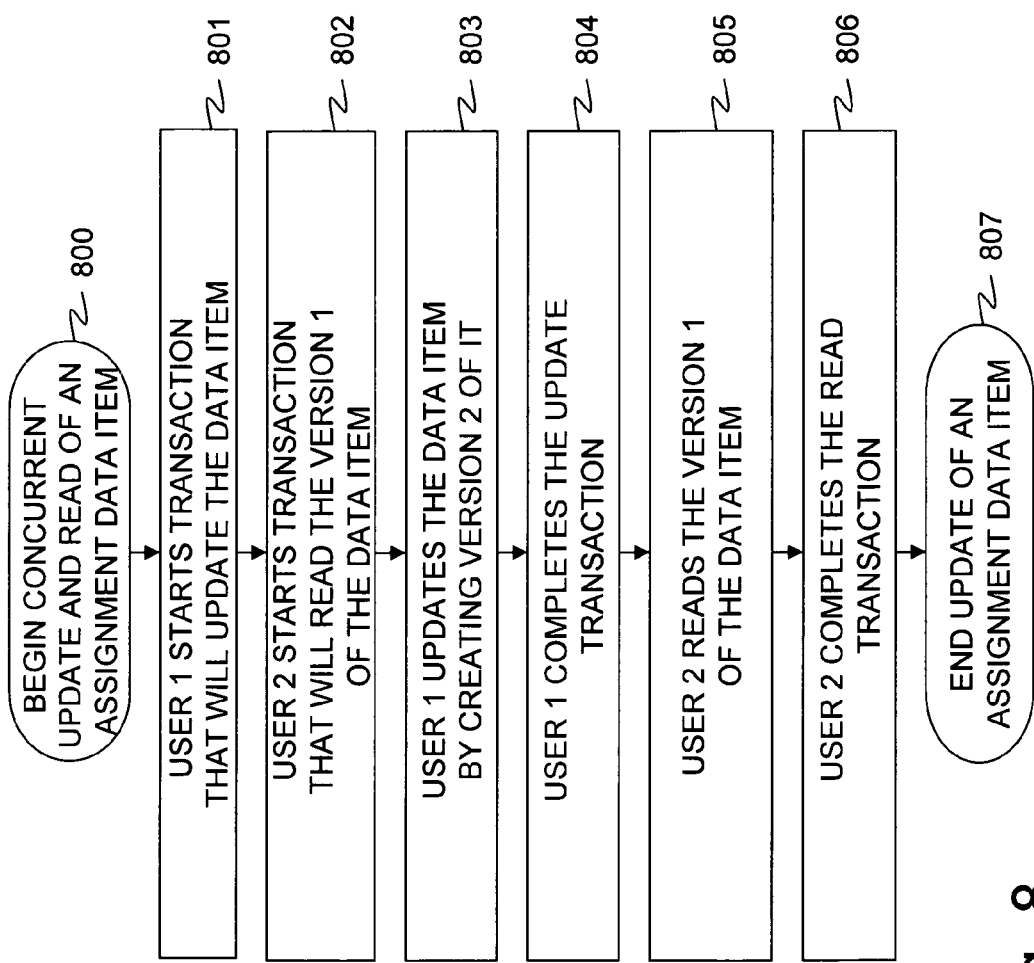
FIG. 8 illustrates an exemplary method of reading and writing content assignment data concurrently according to the invention.

In a large system, some data of the database of the content delivery server may be read by one user while the same data item is being updated by another user. For example, a multimedia terminal may be reading a content assignment data item from the content delivery server while the server is updating the same content assignment data item 630. The server may for example be deleting the content assignment data item while it is being read. To achieve the best possible data availability and performance of the system in this kind of mixed-load usage scenario, the data management component such as a relational database server running in the content delivery server advantageously supports versioning concurrency control. FIG. 8 shows an example about using versioning concurrency control when reading and writing the same data item concurrently 800. The first user of the content delivery server starts a transaction that will later update a data item 801. The second user of the server starts another transaction that will read the current version of the data item 802. Next, the first user updates the data item by creating a new version of the item 803 (e.g., marks it deleted) and commits the transaction making the new version of the data item persistent 804. Although a persistent data item, this new version is not visible to the transaction of the second user. Therefore, when the second user reads 805 the data item and commits the read transaction 806, it "sees" the older version of the data item. Update of an assignment data item ends at 807. The use of versioning concurrency control thus allows implementing a system where reading users always have access to the data even if the same data is being updated. This is advantageous over locking concurrency control where an update operation blocks all other access to the data item. Locking concurrency control is used not only in some database management systems but also in file systems known by prior art. Because of the locking characteristics of a file system, use of a file system for storing frequently accessed or modified data of the system is not preferred in the method and system according to the invention.

The rule match data for content and devices, such as data of the CONTENT_RULE_MATCH 600 and DEVICE_R-

Figure 9:
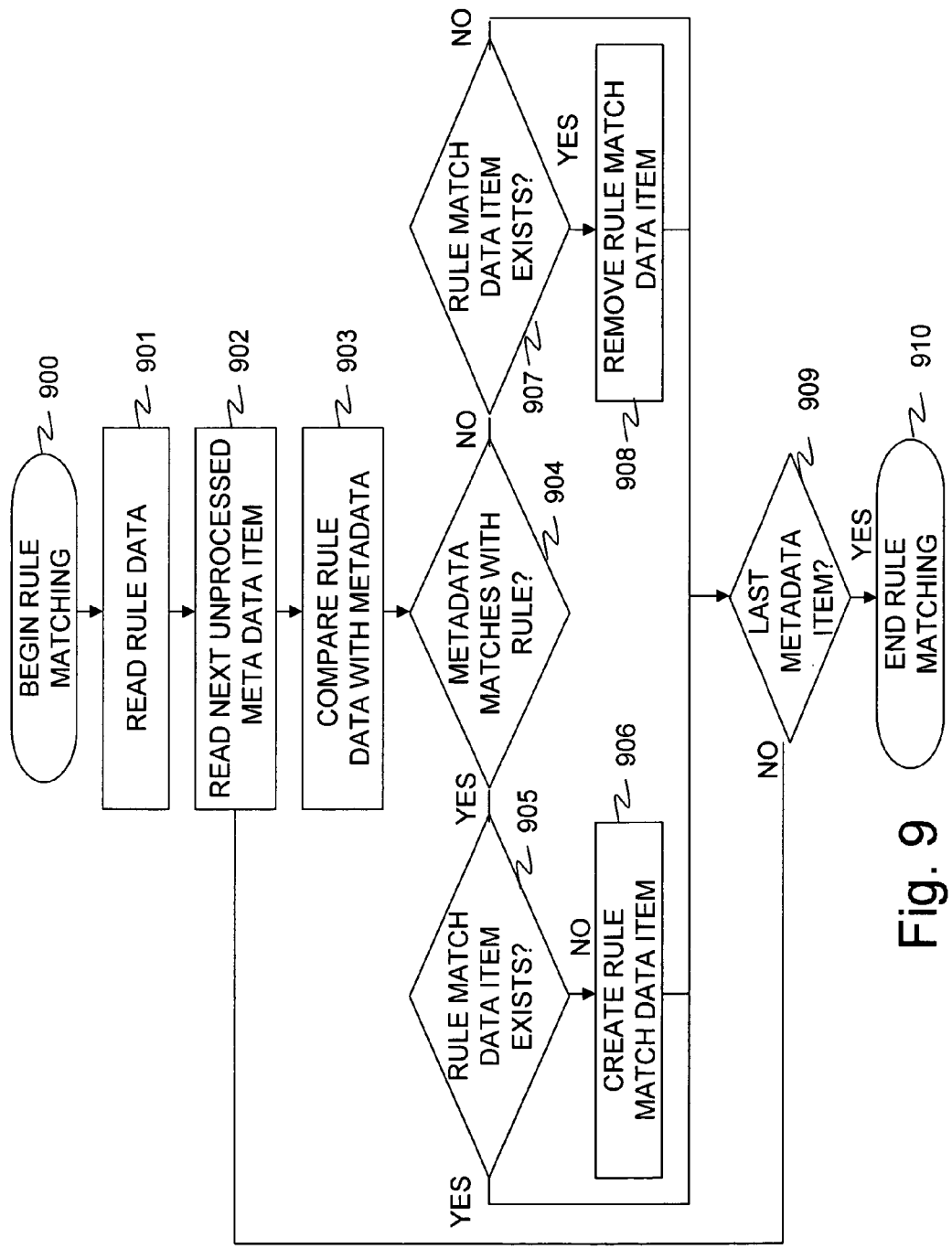
FIG. 9 illustrates an exemplary method of matching rule data against metadata according to the invention.

ULE_MATCH tables 610 needs to be maintained by some computer executable program logic. A simplified example of such logic to process one rule is described in the flow chart of FIG. 9. The logic of the present example is applicable to searching both content data and device data. The server 100, 110, 112, 120, 121, 122 or 123 whose responsibility is to maintain the rule match data begins rule matching 900, reads the data of a rule 901 and reads metadata items of a content or device data item 902. The program logic then compares the rule data with the metadata 903 and determines whether the metadata matches with the criteria of the rule 904. If there is a match, the program logic checks if a rule match item for the related content segment or metadata item already exists 905. If it doesn't, the program logic creates a new rule match data item 906. If the metadata doesn't match with criteria of the rule, the program logic checks if the rule match data for the related content segment or device data item exists 907. If the rule match data item exists, it is deleted 908. If the read metadata item was not the last one to be processed 909, the program logic execution goes back to reading metadata items of another content or device data item 902. If the read metadata item was the last one to be processed 909, the program logic execution ends rule matching 910.

Figure 10:
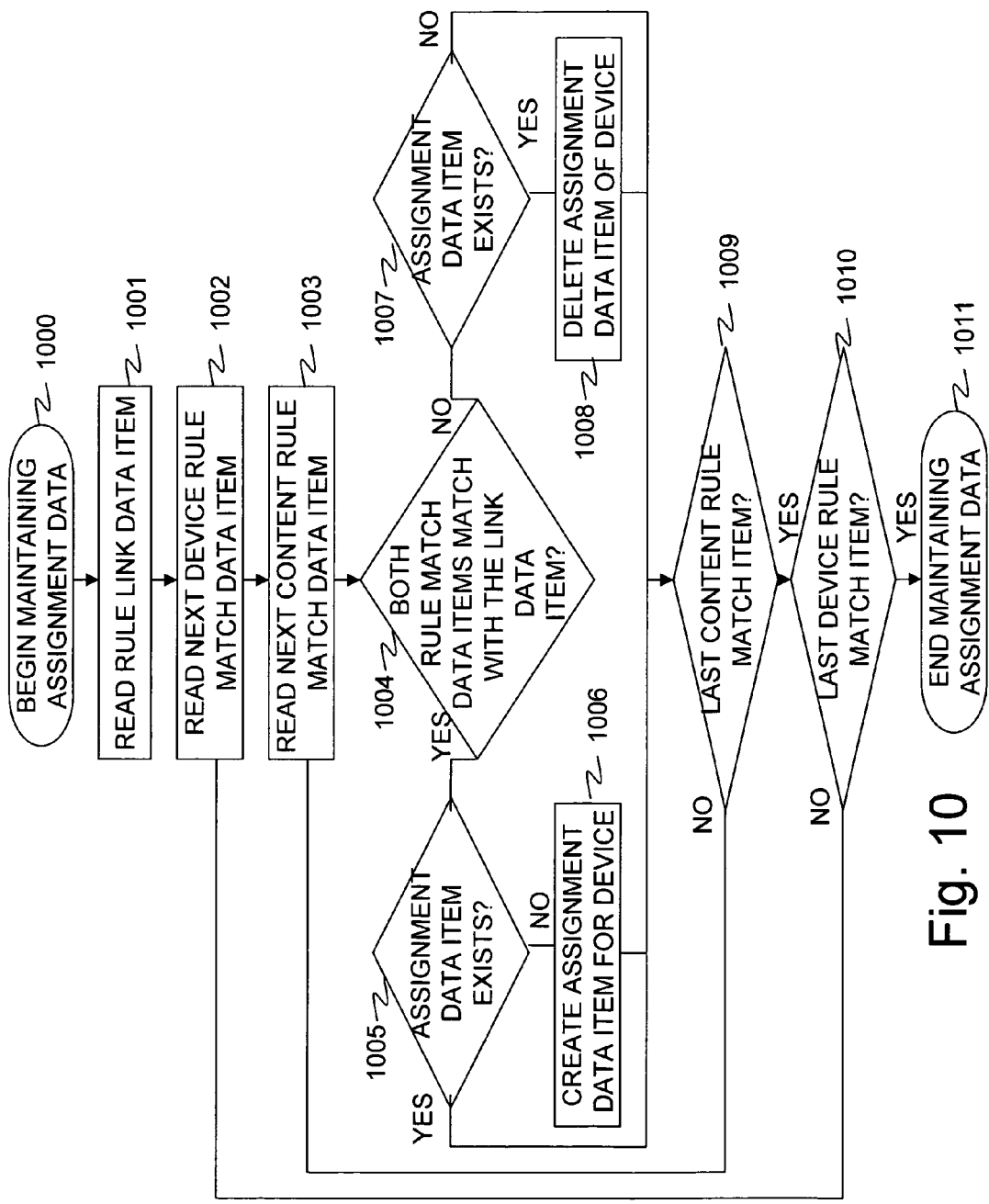
FIG. 10 illustrates an exemplary method of maintaining the content assignment data according to the invention.

Once the rule match data for content and device data items has been updated, the program logic of the content delivery server can perform the content assignment data maintenance task. One simplified exemplary method to perform such task is shown in FIG. 10. The program logic begins maintaining assignment data 1000 and reads a rule link data item 1001. Then, the server searches a device rule match data item 1002 and content rule match data item 1003. If both content and device rule match data items match with the link data item 1004, the program logic checks if an assignment data item already exists 1005. If the assignment data item doesn't exist, the program logic creates a new one 1006 for the identified combination of device and content. If the rule match data items don't match with the link data item 1004, the program logic checks if there exists an assignment data item anyway 1007. If such item exists, it is deleted 1008. The program logic goes back to reading the next content rule match data item 1003 if there are additional content rule match items 1009. Finally, the program logic goes back to reading the next device rule match item 1010 if such item exists. The assignment maintenance task ends 1011 when all rule match items related to rule link data items have been processed. It should be noted that the method explained here is a simplified one for the sake of clarity. In an actual implementation, several improvements to the present method are possible to enhance performance and other aspects of the method.

Now that the content assignment data has been updated after changes in the content rule match data, device rule match data and rule link data, the content delivery server 100, 112, 123, 204 may deliver content to a terminal device 102, 114, 124, 207. One possible method for implementing such functionality is shown at a high level in FIG. 11*a*. Content delivery to a terminal begins at 1100. A terminal device may send a content delivery request to server 1101. As part of the request, the terminal includes the unique identifier of the terminal into the request. The step 1101 is optional. The server may prepare a content package to the terminal 1102 also without a terminal request. The content package contains data that is needed to maintain the local copy of the content data in the terminal device. The terminal downloads the completed, transactionally consistent package 1103 and executes it in the terminal device 1104 altering the local copy of the content data stored in the storage device of the terminal. Content delivery ends at 1105.

Figure 11:
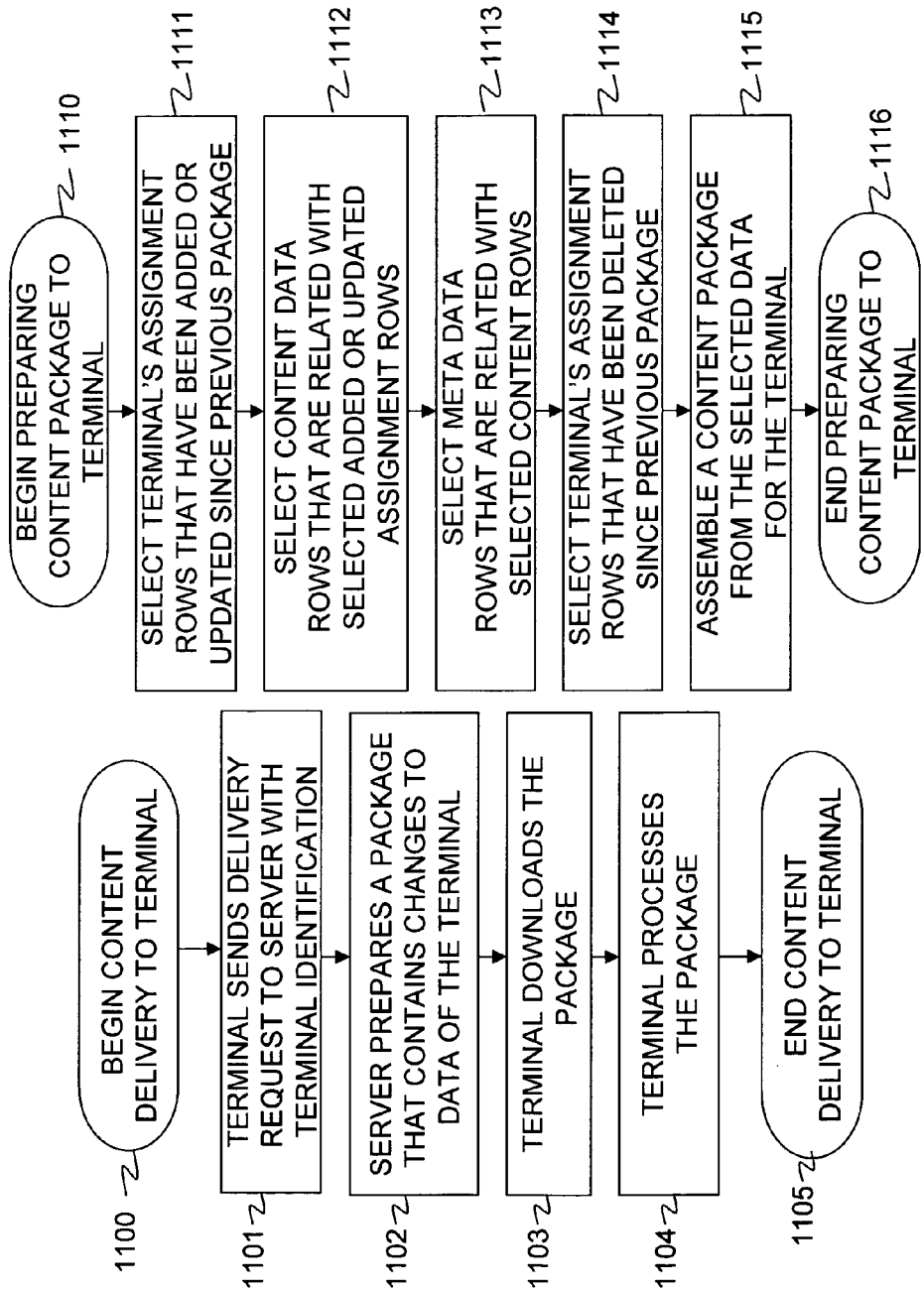
FIGS. 11a and 11b illustrate an exemplary method of assembling and delivering a content package to a terminal device.

A more detailed exemplary explanation about creating a content package mentioned in step 1102 is shown in the flow chart of FIG. 11*b*. The program logic related to this task selects all those assignment data items (data items are called database rows in relational databases) that have been added or updated in the content delivery server since the assembly of the previous content package for the terminal 1111. Once the necessary assignment data items have been identified, the related content data items including the streaming data 1112 and the metadata of the content 1113 are included in the content package. In some embodiments of the invention, content's streaming data and/or metadata may be requested from the server to the terminal in a separate content package. Next, the program logic selects content assignment rows that have been deleted from the content delivery server's database since the previous content package and creates data deletion instruction data for deleting the corresponding data from the terminal's database 1114. Finally, the server persists the assembled content package 1115 and preparing the content package is ended 1116. Now the content data package is ready for delivery to the terminal 1103. Advantageously, the task 1110 is performed by a data synchronization module of a relational database server. It is also advantageous to perform the entire content package assembly process for one terminal in one database transaction that can be cancelled (rolled back) as a whole if an error happens. This guarantees the consistency of the data of the content package. Further, it is advantageous to store the content's streaming data in the same database instead of separate files in the file system so that the streaming data can be managed in the same transactions and using the same versioning concurrency control techniques as the other related data such as metadata, rule match data and content assignment data.

Figure 12:
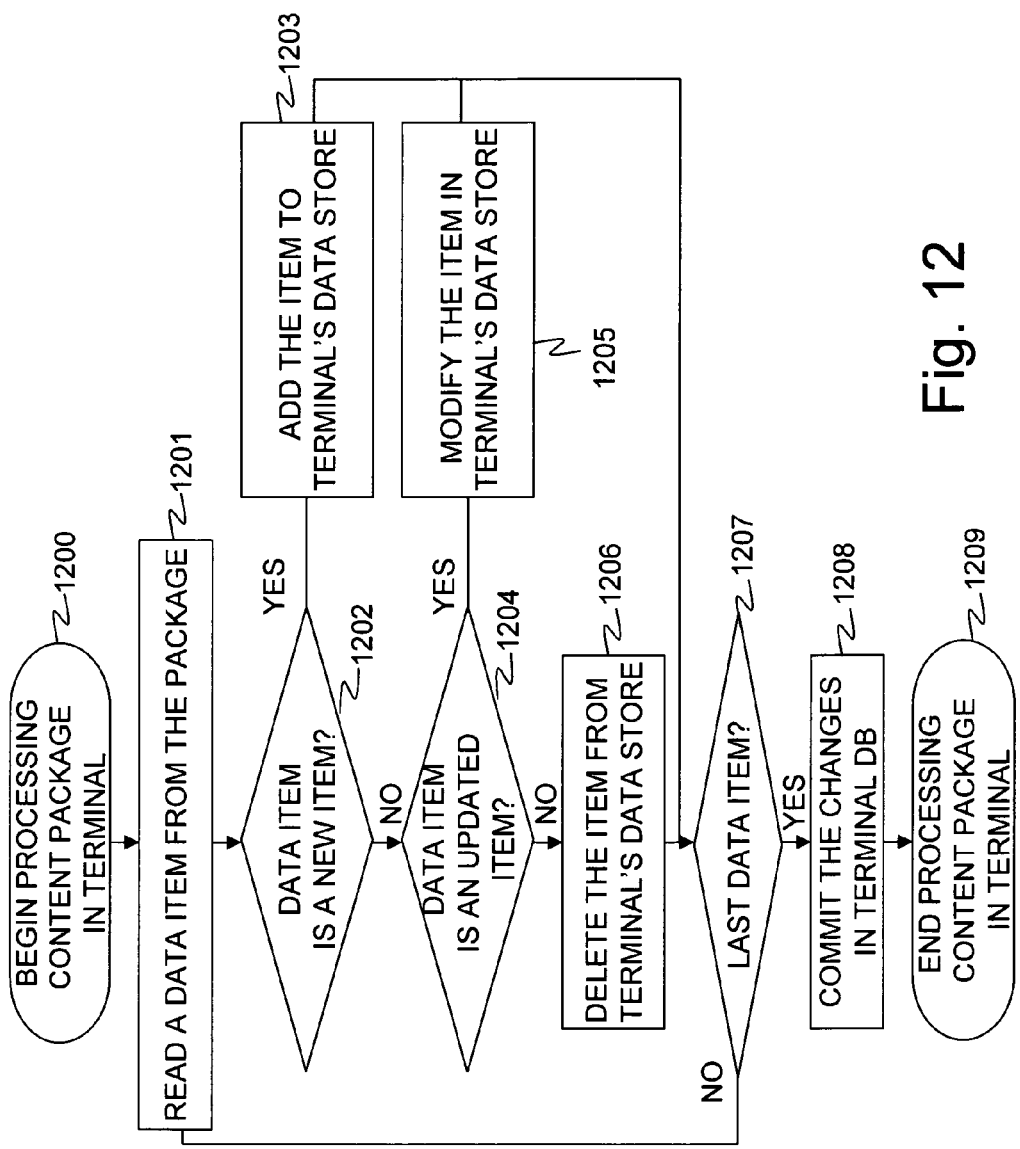
FIG. 12 illustrates an exemplary method of processing the delivered content package in a terminal device.

FIG. 12 illustrates an exemplary method of applying data of a content package in a terminal device. At 1200, processing of a content package begins. A piece of program logic in the terminal device reads a data item from the content package 1201 and checks if it is a new data item 1202. If it is, the program logic adds the item to the terminal's data store 1203. The data store may be managed for example by a relational database server. If the data item is an updated version of a data item that already exists in the terminal's database 1204, the data item stored in terminal's data store is updated 1205. If the data item is neither new nor updated item, it can be assumed to be a deleted data item (table row) that needs to be deleted also from the terminal's data store 1206. If more unprocessed data items are in the content package 1207, the program logic reads 1201 and processes those data items. Finally, the changes are committed in the terminal's data store. The commit operation 1208 makes the updates persistent and also makes the updated data visible to the applications of the terminal device and the content package processing ends 1209. In a relational database system that is capable of transactional data management, updates are neither visible nor persistent until the commit operation has successfully completed. Because of this transactional capability of a database server, the application programs can assume that their view to the database is always a consistent one, i.e., data of incomplete transactions is not visible to the application program. An inconsistent view to data could cause erroneous behavior of the application. For example, if an application can access metadata of a content segment but the streaming data of the segment is not yet visible in the local data store, the application may experience a fatal error. Because of this data consistency issue, it is advantageous to have a transactionally operating relational database server to manage all data, including the streaming data, in the terminal device.

Figure 13:
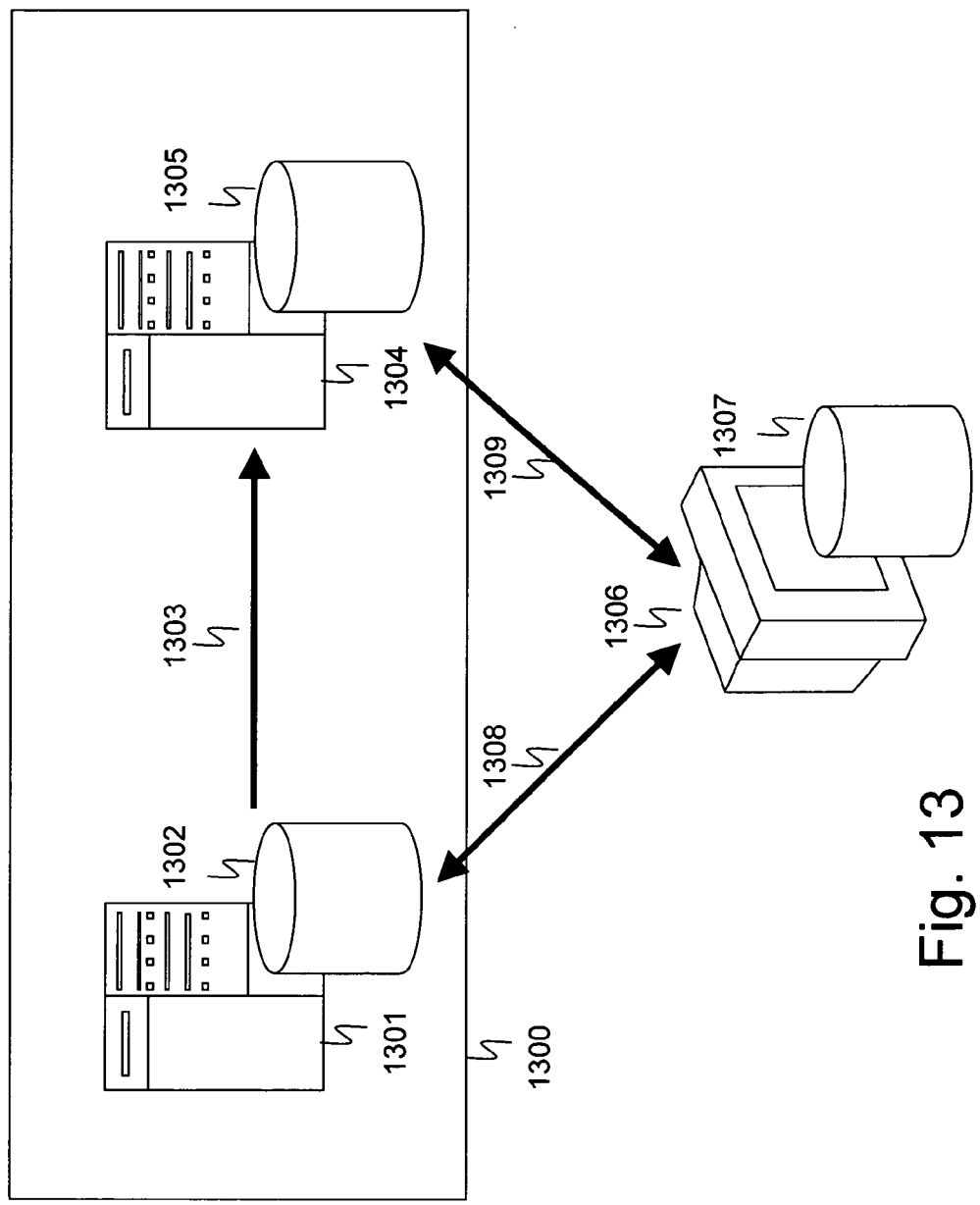
FIG. 13 illustrates an exemplary arrangement of content delivery servers to achieve high availability and fault tolerance.

FIG. 13 illustrates a way to achieve fault tolerance and high availability using a mirrored pair 1300 of computers as a content delivery server. Both computers 1301, 1304 run a database management process managing data that resides in the storage devices 1302, 1305 of the computers. One computer of the server pair acts as a primary server 1301 to which all write transactions are primarily committed. Whenever a commit of a transaction is executed in the primary server, the data is sent to the secondary server 1304 over a data communication network 1303 and the same transaction is executed also in the secondary server. The transaction is committed in the primary server only if the transaction execution is successful in both primary and secondary server. If the transaction fails in either of the server, neither of the servers will contain the data of the transaction. This guarantees that databases of both servers will have always identical data in them. Because of this, the terminal device 1306, with storage device 1307, that usually interacts with the primary server 1301 and downloads data from the storage 1302 may in case of an error in the primary server 1301 or in the data network 1308 switch to using the secondary server 1304 and data network 1309. The failover to the new server is trivial as both servers have the same data. Because of the easy failover capability from one database server to another one, it is advantageous to manage all data needed by the terminals, including the content data (e.g., streaming and/or document data), in the mirrored databases. If the content data was kept in file systems of the servers, error handling in failure situations would be much more complex because the database management system cannot guarantee consistency and availability of the data that is not in the database.

To a person skilled in the art it is obvious that in order to have an illustrative description the above presented exemplary embodiments have a structure and a function, which are relatively simple. By applying the model presented in this application it is possible to design different and very complicated systems, which in obvious ways to the expert, utilize the inventive idea presented in this application.

One should note that, although embodiments concerning streaming data delivery are described, the invention is also well applicable to other data delivery solutions, such as delivery of computer executable application software and configuration data.

While the present invention has been described in accordance with preferred compositions and embodiments, it is to be understood that certain substitutions and alterations may be made thereto without departing from the spirit and scope of the following claims.

The invention claimed is:

1. A computer-implemented method for delivering digital content data from a first computer to one or more specific second computers comprising:

identifying, via said first computer, at least one set of content data items satisfying a content selection rule from a plurality of content data items, wherein each content data item is associated with a corresponding content metadata item, wherein said content selection rule includes at least one criterion each specifying a value within content metadata items and each content data item of said at least one identified set of content data items is associated with a corresponding content metadata item including that value to satisfy said content selection rule, and wherein a content rule identifier identifying said content selection rule and one or more content identifiers identifying said identified content data items are stored in a first storage structure to indicate content data items satisfying said content selection rule;

identifying, via said first computer, at least one set of second computers satisfying a device selection rule from a plurality of second computers, wherein each of at least one device data item representing a second computer is associated with a corresponding device metadata item, wherein said device selection rule includes at least one criterion each specifying a value within device metadata items and each second computer of said at least one identified set of second computers is associated with a corresponding device metadata item including that value to satisfy said device selection rule, and wherein a device rule identifier identifying said device selection rule and one or more device identifiers identifying said identified second computers are stored in a second storage structure to indicate second computers satisfying said device selection rule;

linking, via said first computer, said content selection rule with said device selection rule to link said at least one identified set of content data items satisfying said content selection rule with said at least one identified set of second computers satisfying said device selection rule for distribution of at least one content data item to at least one second computer, wherein said content rule identifier and said device rule identifier are stored in a third storage structure to indicate content data items linked with second computers;

assigning, via said first computer, at least one content data item of said at least one identified set of content data items to at least one second computer of said at least one identified set of second computers based on said linking of said at least one identified set of content data items with said at least one identified set of second computers; and synchronizing, via said first computer, said content data items residing on said second computers with said content data items assigned to those second computers in response to a change in at least one of said content data items and said assignments of said content data items.

2. The method according to claim 1, wherein said at least one identified set of content data items is maintained by matching said content metadata item of said at least one content data item with at least one content selection rule.

3. The method according to claim 2, wherein said first computer maintains at least one persistent content rule match data item to represent said match between said at least one content data item and said at least one content selection rule.

4. The method according to claim 1, wherein said at least one identified set of second computers is maintained by matching said device metadata item of said at least one device data item representing at least one second computer with at least one device selection rule.

5. The method according to claim 4, wherein said first computer maintains at least one persistent device rule match data item to represent said match between said at least one second computer and said at least one device selection rule.

6. The method according to claim 1, wherein said first computer maintains at least one persistent content assignment data item to represent said assignment of said at least one content data item to said at least one second computer.

7. The method according to claim 1, wherein said first computer comprises a database server providing transactional data management.

8. The method according to claim 7, wherein a copy of all data of said database server is maintained in another first computer running a database server.

9. The method according to claim 8, wherein said another first computer takes over the role of the first computer if an error occurs in the first computer.

10. The method according to claim 7, wherein said database server manages said content data items and said device data items stored in said first computer.

11. The method according to claim 6, wherein a database server of said first computer creates a new version of said at least one content data item and/or said corresponding content metadata item and/or said content assignment data item to be updated, said creation of said new version not blocking read access to a previous version of said data item and said new version not being visible to at least one other concurrent user of said database server until said other concurrent user has committed its transaction.

12. The method according to claim 10, wherein said first computer performs a plurality of said assignment operations of content data items to said at least one second computer in one database transaction.

13. The method according to claim 1, wherein said first computer assembles at least one content update package comprising at least one content data item for delivery to at least one second computer based on at least one said assignment.

14. The method according to claim 13, wherein said at least one content update package is transmitted from said first computer to said at least one second computer.

15. The method according to claim 13, wherein said content update package comprises at least one of the following:
   a. at least one content data item,
   b. at least one content metadata item associated with a content data item,
   c. a data item to instruct deletion of at least one content data item that is stored in said at least one second computer, and
   d. a data item to instruct deletion of a content metadata item that is stored in said at least one second computer.

16. The method according to claim 15, wherein at least one content data item of said content update package is included into said package as a result of a relational join operation between a table containing at least one content assignment data item and a table containing said at least one content data item, wherein said at least one content assignment data item represents said assignment of said at least one content data item to said at least one second computer.

17. The method according to claim 15, wherein said at least one second computer updates at least one content data item and/or at least one content metadata item based on the data of said content update package.

18. The method according to claim 17, wherein said at least one second computer comprises a database server providing transactional data management.

19. The method according to claim 18, wherein said database server creates a new version of said at least one content data item and/or said corresponding content metadata item to be updated, said creation of said new version not blocking read access to a previous version of said data item and said new version not being visible to at least one other concurrent user of said database server until said other concurrent user has committed its transaction.

20. The method according to claim 1, wherein a master copy of any of the data items stored in said first computer is stored in at least one third computer and said first computer maintains a full or partial replica copy of said data items.

21. The method according to claim 20, wherein data changed in at least one third computer is synchronized to said first computer.

22. The method according to claim 20, wherein data changed in said first computer is synchronized to said at least one third computer.

23. The method according to claim 3, wherein said at least one content rule match data item is maintained by program logic executed in said first computer.

24. The method according to claim 3, wherein said at least one content rule match data item is maintained by program logic executed in at least one third computer.

25. The method according to claim 5, wherein said at least one device rule match data item is maintained by program logic executed in said first computer.

26. The method according to claim 5, wherein said at least one device rule match data item is maintained by program logic executed in at least one third computer.

27. The method according to claim 1, wherein said digital content data is any of the following: streaming data, document data, XML data, HTTP pages, computer executable scripts and computer executable application binary code.

28. A system for delivering digital content data comprising:
   a first computer and plurality of second computers, said first computer including at least one storage system for storing a computer program and at least one processor for processing said computer program to:
      identify at least one set of content data items satisfying a content selection rule from a plurality of content data items, wherein each content data item is associated with a corresponding content metadata item, wherein said content selection rule includes at least one criterion each specifying a value within content metadata items and each content data item of said at least one identified set of content data items is associated with a corresponding content metadata item including that value to satisfy said content selection rule, and wherein a content rule identifier identifying said content selection rule and one or more content identifiers identifying said identified content data items are stored in a first storage structure to indicate content data items satisfying said content selection rule;
      identify at least one set of second computers satisfying a device selection rule from a plurality of second computers, wherein each of at least one device data item representing a second computer is associated with a corresponding device metadata item, wherein said device selection rule includes at least one criterion each specifying a value within device metadata items and each second computer of said at least one identified set of second computers is associated with a corresponding device metadata item including that value to satisfy said device selection rule, and wherein a device rule identifier identifying said device selection rule and one or more device identifiers identifying said identified second computers are stored in a second storage structure to indicate second computers satisfying said device selection rule;
      link said content selection rule with said device selection rule to link said at least one identified set of content data items satisfying said content selection rule with said at least one identified set of second computers satisfying said device selection rule for distribution of at least one content data item to at least one second computer, wherein said content rule identifier and said device rule identifier are stored in a third storage structure to indicate content data items linked with second computers;

assign at least one content data item of said at least one identified set of content data items to at least one second computer of said at least one identified set of second computers based on said linking of said at least one identified set of content data items with said at least one identified set of second computers; and synchronize said content data items residing on said second computers with said content data items assigned to those second computers in response to a change in at least one of said content data items and said assignments of said content data items.

29. The system according to claim 28, wherein said at least one identified set of content data items is arranged to be maintained by matching said content metadata item of said at least one content data item with at least one content selection rule.

30. The system according to claim 29, wherein said first computer is arranged to maintain at least one persistent content rule match data item to represent said match between said at least one content data item and said at least one content selection rule.

31. The system according to claim 28, wherein said at least one identified set of second computers is arranged to be maintained by matching said device metadata item of said at least one device data item representing at least one second computer with at least one device selection rule.

32. The system according to claim 31, wherein said first computer is arranged to maintain at least one persistent device rule match data item to represent said match between said at least one second computer and said at least one device selection rule.

33. The system according to claim 28, wherein said first computer is arranged to maintain at least one persistent content assignment data item to represent said assignment of said at least one content data item to said at least one second computer.

34. The system according to claim 28, wherein said first computer is arranged to comprise a database server providing transactional data management.

35. The system according to claim 34, wherein a copy of all data of said database server is arranged to be maintained in another first computer running a database server.

36. The system according to claim 35, wherein said another first computer is arranged to take over the role of the first computer if an error occurs in the first computer.

37. The system according to claim 34, wherein said database server is arranged to manage said content data items and said device data items stored in said first computer.

38. The system according to claim 33, wherein a database server of said first computer is arranged to create a new version of said at least one content data item and/or said corresponding content metadata item and/or said content assignment data item to be updated, said creation of said new version not blocking read access to a previous version of said data item and said new version not being visible to at least one other concurrent user of said database server until said other concurrent user has committed said other concurrent user's transaction.

39. The system according to claim 37, wherein said first computer is arranged to perform a plurality of said assignment operations of content data items to said at least one second computer in one database transaction.

40. The system according to claim 28, wherein said first computer is arranged to assemble at least one content update package comprising at least one content data item for delivery to at least one second computer based on at least one said assignment.

41. The system according to claim 40, wherein said at least one content update package is arranged to be transmitted from said first computer to said at least one second computer.

42. The system according to claim 40, wherein said content update package is arranged to contain at least one of the following:
a. at least one content data item,
b. at least one content metadata item associated with a content data item,
c. a data item to instruct deletion of at least one content data item that is stored in said at least one second computer, and
d. a data item to instruct deletion of a content metadata item that is stored in said at least one second computer.

43. The system according to claim 42, wherein at least one content data item of said content update package is arranged to be included into said package as a result of a relational join operation between a table containing at least one content assignment data item and a table containing said at least one content data item, wherein said at least one content assignment data item represents said assignment of said at least one content data item to said at least one second computer.

44. The system according to claim 42, wherein said at least one second computer is arranged to update at least one content data item and/or at least one content metadata item based on the data of said content update package.

45. The system according to claim 44, wherein said at least one second computer comprises a database server providing transactional data management.

46. The system according to claim 45, wherein said database server is arranged to create a new version of said at least one content data item and/or said corresponding content metadata item to be updated, said creation of said new version arranged to be not blocking read access to a previous version of said data item and said new version arranged to be not being visible to at least one other concurrent user of said database server until said other concurrent user has committed its transaction.

47. The system according to claim 28, wherein a master copy of any of the data items arranged to be stored in said first computer is stored in at least one third computer and said first computer is arranged to maintain a full or partial replica copy of said data items.

48. The system according to claim 47, wherein data changed in said at least one third computer is arranged to be synchronized to said first computer.

49. The system according to claim 47, wherein data changed in said first computer is arranged to be synchronized to said at least one third computer.

50. The system according to claim 30, wherein said at least one content rule match data item is arranged to be maintained by program logic executed in said first computer.

51. The system according to claim 30, wherein said at least one content rule match data item is arranged to be maintained by program logic executed in at least one third computer.

52. The system according to claim 32, wherein said at least one device rule match data item is arranged to be maintained by program logic executed in said first computer.

53. The system according to claim 32, wherein said at least one device rule match data item is maintained by program logic executed in at least one third computer.

54. The system according to claim 28, wherein said digital content data is arranged to be any of the following: streaming data, document data, XML data, HTTP pages, computer executable scripts and computer executable application binary code.

55. A computer program product for delivering digital content data from a first computer to one or more specific second computers, the computer program product comprising:
a computer readable storage medium having computer readable program code embodied therewith, the computer readable program code comprising computer readable program code configured to:
identify at least one set of content data items satisfying a content selection rule from a plurality of content data items, wherein each content data item is associated with a corresponding content metadata item, wherein said content selection rule includes at least one criterion each specifying a value within content metadata items and each content data item of said at least one identified set of content data items is associated with a corresponding content metadata item including that value to satisfy said content selection rule, and wherein a content rule identifier identifying said content selection rule and one or more content identifiers identifying said identified content data items are stored in a first storage structure to indicate content data items satisfying said content selection rule;
identify at least one set of second computers satisfying a device selection rule from a plurality of second computers, wherein each of at least one device data item representing a second computer is associated with a corresponding device metadata item, and wherein said device selection rule includes at least one criterion each specifying a value within device metadata items and each second computer of said at least one identified set of second computers is associated with a corresponding device metadata item including that value to satisfy said device selection rule, and wherein a device rule identifier identifying said device selection rule and one or more device identifiers identifying said identified second computers are stored in a second storage structure to indicate second computers satisfying said device selection rule;
link said content selection rule with said device selection rule to link said at least one identified set of content data items satisfying said content selection rule with said at least one identified set of second computers satisfying said device selection rule for distribution of at least one content data item to at least one second computer, wherein said content rule identifier and said device rule identifier are stored in a third storage structure to indicate content data items linked with second computers;
assign at least one content data item of at least one identified set of content data items to at least one second computer of said at least one identified set of second computers based on said linking of said at least one identified set of content data items with said at least one identified set of second computers; and
synchronize, via said first computer, said content data items residing on said second computers with said content data items assigned to those second computers in response to a change in at least one of said content data items and said assignments of said content data items.

56. The computer program product according to claim 55, wherein said computer readable program code is further configured to maintain said at least one identified set of content data items by matching said content metadata item of said at least one content data item with at least one content selection rule.

57. The computer program product according to claim 56, wherein said computer readable program code is further configured to maintain at least one persistent content rule match data item to represent said match between said at least one content data item and said at least one content selection rule.

58. The computer program product according to claim 55, wherein said computer readable program code is further configured to maintain said at least one identified set of second computers by matching said device metadata item of said at least one device data item representing at least one second computer with at least one device selection rule.

59. The computer program product according to claim 58, wherein said computer readable program code is further configured to maintain at least one persistent device rule match data item to represent said match between said at least one second computer and said at least one device selection rule.

60. The computer program product according to claim 55, wherein said computer readable program code is further configured to maintain at least one persistent content assignment data item to represent said assignment of said at least one content data item to said at least one second computer.

61. The computer program product according to claim 55, wherein said first computer comprises a database server providing transactional data management.

62. The computer program product according to claim 61, wherein a copy of all data of said database server is maintained in another first computer running a database server.

63. The computer program product according to claim 62, wherein said computer readable program code is further configured to enable another first computer to take over the role of said first computer, if an error occurs in said first computer.

64. The computer program product according to claim 61, wherein said computer readable program code is further configured to enable said database server to manage said content data items and said device data items stored in said first computer.

65. The computer program product according to claim 60, wherein said computer readable program code is further configured to enable a database server of said first computer to create a new version of said at least one content data item and/or said corresponding content metadata item and/or said content assignment data item to be updated, said creation of said new version not blocking read access to a previous version of said data item and said new version not being visible to at least one other concurrent user of said database server until said other concurrent user has committed its transaction.

66. The computer program product according to claim 64, wherein said computer readable program code is further configured to enable said first computer to perform a plurality of said assignment operations of content data items to said at least one second computer in one database transaction.

67. The computer program product according to claim 55, wherein said computer readable program code is further configured to enable said first computer to assemble at least one content update package comprising at least one content data item for delivery to at least one second computer based on at least one said assignment.

68. The computer program product according to claim 67, wherein said at least one content update package is transmitted from said first computer to said at least one second computer.

69. The computer program product according to claim 67, wherein said content update package comprises at least one of the following:
a. at least one content data item,
b. at least one content metadata item associated with a content data item, c. a data item to instruct deletion of at least one content data item that is stored in said at least one second computer, and d. a data item to instruct deletion of a content metadata item that is stored in said at least one second computer.

70. The computer program product according to claim 69, wherein at least one content data item of said content update package is included into said package as a result of a relational join operation between a table containing at least one content assignment data item and a table containing said at least one content data item, wherein said at least one content assignment data item represents said assignment of said at least one content data item to said at least one second computer.

71. The computer program product according to claim 69, wherein said computer readable program code is further configured to enable at least one second computer to update at least one content data item and/or at least one content metadata item based on the data of said content update package.

72. The computer program product according to claim 71, wherein said at least one second computer comprises a database server providing transactional data management.

73. The computer program product according to claim 72, wherein said computer readable program code is further configured to enable said database server to create a new version of said at least one content data item and/or said corresponding content metadata item to be updated, said creation of said new version not blocking read access to a previous version of said data item and said new version not being visible to at least one other concurrent user of said database server until said other concurrent user has committed said other concurrent user's transaction.

74. The computer program product according to claim 55, wherein a master copy of any of the data items stored in said first computer is stored in at least one third computer and said first computer maintains a full or partial replica copy of said data items.

75. The computer program product according to claim 74, wherein said computer readable program code is further configured to enable data changed in said at least one third computer to be synchronized to said first computer.

76. The computer program product according to claim 74, wherein said computer readable program code is further configured to enable data changed in said first computer to be synchronized to said at least one third computer.

77. The computer program product according to claim 57, wherein said at least one content rule match data item is maintained by said computer readable program code executed in said first computer.

78. The computer program product according to claim 57, wherein said at least one content rule match data item is maintained by said computer readable program code executed in at least one third computer.

79. The computer program product according to claim 59, wherein said at least one device rule match data item is maintained by said computer readable program code executed in said first computer.

80. The computer program product according to claim 59, wherein said at least one device rule match data item is maintained by said computer readable program code executed in at least one third computer.

81. The computer program product according to claim 55, wherein said digital content data is any of the following: streaming data, document data, XML data, HTTP pages, computer executable scripts and computer executable application binary code.

82. The method according to claim 1, wherein said synchronizing includes removing from a second computer a content data item that is no longer assigned to that second computer.

83. The system according to claim 28, wherein said synchronizing includes removing from a second computer a content data item that is no longer assigned to that second computer.

84. The computer program product according to claim 55, wherein said synchronizing includes removing from a second computer a content data item that is no longer assigned to that second computer.

* * * * *